Patented July 7, 1936

2,046,532

UNITED STATES PATENT OFFICE 2,046,532

METHOD OF MAKING FUEL BRIQUETTES

Arthur A. Roberts, London, England; Arthur Roberts, Wanstead, England, and Clifford Wilbur Smith, Maida Vale, England, administrators of said Arthur A. Roberts, deceased No Drawing. Application February 23, 1933, Serial No. 658,254. In Great Britain February 23, 1932

2 Claims. (Cl. 44—19)

This invention relates to the manufacture of fuel briquettes and has for its chief object a compounding of the constituents of a fuel mixture and a treatment of the same in such a manner that a briquette of novel and technically and industrially valuable properties is obtained.

The usual method of making briquettes involves a mixing of carbonaceous particles with suitable binding or cementing material, the moulding of the mixture under pressure into briquette form and the heat treatment of the moulded articles.

As a result of intensive study and extensive practical research on this subject I have found that the character of briquettes is predetermined to an unexpected and unforeseen extent by having proper regard to certain factors of compounding and treatment and the present invention consists in certain novel features in the manufacture of fuel briquettes as will now be described.

For convenience of further description, I will assume that briquettes are compounded from three main components, namely solid carbonaceous matter (whether containing hydrocarbons or not), inorganic bonding material of the nature of cement, and organic bonding material such as pitch and water. An additional chemical substance or additional chemical substances such as sodium chloride or boric acid may also be included for purposes which are hereinafter described.

One of the features of the present invention is concerned with the relation between the amount of the water component of the mixture and the chemical and physical condition of the other components. In this connection the degree of fineness of the carbonaceous matter plays an important part and I have found that it should correspond to a mesh of about 25 to 100 holes per square inch, that is to say substantially all (98%) of the carbonaceous matter should pass through a screen having a mesh of that order. Assuming a fineness of carbonaceous component such that it will just pass a 25 mesh screen and no added organic matter, the amount of water to be added (i. e. addition to any free water naturally contained in the carbonaceous matter under ordinary storage conditions and at ordinary temperatures) should be about one and one quarter times the weight combined inorganic and organic bonding material present and other chemical substance or substances added.

The amount of water required to properly diffuse the amount of bonding material required increases in direct proportion to the fineness of mesh of the carbonaceous material, because the finer the mesh the more difficult it is to diffuse the bonding material; thus, for example, the amount required for carbonaceous material capable of passing a screen of 60 mesh to the linear inch is about twice the amount required for material capable of passing a screen of 30 mesh to the linear inch.

A further feature of the present invention is the exceptionally small amount of bonding material required. This I attribute largely to the fact that the components of the bonding material do not function solely by reason of their properties at the instant of incorporation but also by reason of the effect of the other factors prevailing then and afterwards whereby a composite bond in a highly dispersed or film-like state develops in situ. For example, a bond compounded from water as above mentioned, with not more than 5% of hydraulic cement as a maximum is able to exercise an astonishingly great, uniform, and rapid bonding effect that cannot be attributed to the mere cementing action of so small a quantity of cement, more especially when a small quantity of alkali metal chloride or boric acid is present. The amount of organic bonding material does not usually exceed about 7%.

Naturally the temperature and pressure to which the total mixture is subjected in the formation of it into briquettes are important factors. I have found that from 2,000 to 10,000 lbs. per sq. inch is a suitable pressure and that a remarkably low temperature should be adopted for the mixture when introduced into the presses, namely, about 100° to 120° F.

Generally speaking, the more intense the disintegrating influences to which the briquettes are subjected during burning, the higher should be the briquetting pressure and the higher the temperature during briquetting; for example, briquettes destined for combustion in furnaces, particularly with forced draught require higher pressure and temperature and stronger bonding effect than those destined for burning in an open domestic grate.

During the mixing operation constituting the first stage in the briquetting process and preceding transfer of the mixture to the press the temperature should be only about 180° to 250° F. if the carbonaceous matter is almost entirely free from organic matter and not exceeding about 400° F. if organic matter such, for example, as found in coal as distinct from coke, be naturally present. After mixing at such temperature, preferably attained and controlled by admission of live dry steam into the mass, the temperature is allowed to drop to about 100 to 120° F. as above mentioned preparatory to transfer to the press.

The briquetting operation represented by the mixing and pressing as above described, may also include a heat treatment after removal of the moulded material from the press. Such subsequent heat treatment is particularly advantageous for briquettes destined for metallurgical use where the strain of compression and the abrasive effect of released gases tend to be destructive. Such subsequent heat treatment may be effected at a temperature of about 1000° F. to 1800° F. or even below 1000° F. depending on the grade of carbonaceous base and metallurgical fuel required, and has the additional beneficial effect of rendering the briquettes practically smokeless as hereinafter explained.

A small amount of pure salt (sodium chloride) has already been mentioned as a component of a bonding composition. I have found certain chemicals when properly proportioned in very definite percentages greatly accelerate the toughening, hardening and combustion of the briquettes. Such chemicals are for example sodium or potassium chloride in amounts within narrow limits around 0.5% as these exercise a remarkable influence on the combustibility as also on the durability of the finished briquettes as well as playing a part in determining the character of the composite bonding agent formed in situ as above mentioned.

Another very useful component of compositions for briquetting according to the present invention is boric acid or borax. About 0.5 to 1.5% of boric acid especially if used in conjunction with about 0.5% of sodium or potassium chloride has a very marked effect on the clear blueness of the flame during combustion of the briquettes and serves to reduce the amount of ash otherwise remaining after combustion. Other flame colouring substances, for example strontium salts, may be added, if desired.

The following examples serve to indicate briquetting compositions coming within the scope of my invention.

*Example I*

|  | Per cent |
|---|---|
| Cement | 1.0 |
| Asphalt (added) | 7.0 |
| Sodium chloride | 0.5 |
| Water (added) | 10.0 |
| Coke of 30 mesh | 81.5 |
|  | 100.0 |

Briquettes of this composition similarly require a pressure of from 3,000 to 7,000 lbs. per square inch and will readily and quickly ignite and burn rapidly.

*Example II*

|  | Per cent |
|---|---|
| Cement | 4.0 |
| Asphalt (added) | 7.0 |
| Sodium chloride | 0.5 |
| Water (added) | 13.0 |
| Coke of 30 mesh | 75.5 |
|  | 100.0 |

Briquettes of this composition similarly require a pressure of from 3,000 to 6,000 lbs. per square inch and will burn more slowly than those according to Example I owing to the retarding effect of the cement.

*Example III*

|  | Per cent |
|---|---|
| Organic matter (added) | 7.0 |
| Sodium chloride | 0.5 |
| Water | 9.0 |
| Coke of 30 mesh | 83.5 |
|  | 100.0 |

Briquettes of this composition similarly require a pressure of from 3,000 to 6,000 lbs. per square inch and are suitable only in exceptional cases, namely where a very rapid ignition and rapid but intense burning temperature is required as for example for ore smelting furnaces.

*Example IV*

|  | Per cent |
|---|---|
| Cement | 5.0 |
| Sodium or potassium chloride | 0.5 |
| Organic matter (added) | 5.0 |
| Water (added) | 13.0 |
| Coke of 30 mesh | 76.5 |
|  | 100.0 |

Briquettes of this composition similarly require a pressure of from 6,000 to 10,000 lbs. per square inch and present great strength, hardness and toughness as required for forced draught with a moderate rate of combustion.

In compounding the constituents the preferred method is to make a mixture of the carbonaceous material and the mineral cement and the organic binding component, and to dissolve separately the salt in the water and then to work the salt solution into the mixture.

The amount of water naturally contained in the carbonaceous material is not so active in affecting the bonding action or determining the growth and character of the bond in situ as is the deliberately added water, and the natural water content is sufficiently small and constant under ordinary circumstances to enable it to be ignored, the instructions hereinbefore contained as to added water have been stated with due regard to natural water content in the carbonaceous material. In very exceptional or extreme circumstances it may, however, be advisable to predetermine the natural water content in the carbonaceous material.

Although in the specific examples above given, the carbonaceous material is coke in every instance, the proportions would not be upset if coal or other carbonaceous material containing hydrocarbons or similar volatile organic matter were used. In fact, in basing the amount of added water upon the amount of binding agent the organic matter naturally present in coal or similar carbonaceous material can be disregarded. This is somewhat remarkable but is explained by the fact that the temperatures I adopt during briquetting are exceptionally low as already mentioned and are in fact so low as not to render appreciably active any latent bonding capacity of organic bonding constituents in the coal. Naturally however, such organic bonding constituents have an effect upon the combustive character of the finished briquettes and this has to be taken into account in determining the nature and amount of the other added substances.

As carbonaceous matter a great variety of materials may be used as petroleum coke, coal coke, undistilled coal, peat, lignite, saw dust, spent tan barks, etc.

When the briquettes leave the press they may be stored ready for use but a further feature of the present invention consists in treating their surface layer with an oxidizing agent to accelerate eventual ignition, such as by dipping the briquettes in a suspension or solution of such agent. Copper oxide or boric acid are suitable for this purpose and their use has the added advantage of making the briquettes very clean to handle. Another ignition accelerator is ferric oxide which has the added advantage of reducing sulphur fumes if the carbonaceous constituent happens to contain sulphur.

Ferric oxide or boric acid are useful not only as a surface ignition accelerator as above mentioned but as an additional component throughout the entire briquettes by being incorporated therein to the extent of about 1% in the case of ferric oxide or 1.5% in the case of boric acid during mixing.

The cement used in the bonding material has a retarding effect on the combustion and the addition of the combustion accelerators serves to counteract or overcome the retarding effect of the cement. In fact these retarding and accelerating properties of these respective substances can be set off against one another to ensure any desired rapidity and intensity of combustion and control of heat generation.

In order to render the briquettes entirely or almost entirely smokeless as a fuel, they may be subjected, before being sold as smokeless fuel briquettes, to distillation at a temperature of 1000° F. or less to drive off volatile matter from the surface layer to a sufficient depth to permit eventual ignition and immediate burning at a temperature above the kindling point to occur so that the remaining gases in the briquette being released during continued burning experience a sufficiently high temperature as they escape from the inner zone of the briquette to become consumed without causing smoke.

I claim:—

1. A method of making fuel briquettes consisting in distributing a powdered water setting cement in a dry state as a bonding material throughout a powdered mass of a carbonaceous fuel material, then evenly distributing an emulsion of a non-fluid asphalt and water throughout the mass, the water being substantially 1¼ times the weight of the two bonding materials, and then molding briquettes from said material before the said cement has set.

2. A method of making fuel briquettes consisting in distributing substantially 1 percent by weight of a powdered water setting cement in a dry state as a bonding material throughout a powdered mass of a carbonaceous fuel material, then evenly distributing an emulsion of a non-fluid asphalt and water throughout the mass, the quantity of asphalt being not over 7 percent by weight of the fuel material, the water being substantially 1¼ times the weight of the two bonding materials, and then molding briquettes from said material before the said cement has set.

ARTHUR A. ROBERTS.